United States Patent [19]
Andries et al.

[11] Patent Number: 5,573,897
[45] Date of Patent: Nov. 12, 1996

[54] METHOD OF APPLYING A TRANSPARENT MAGNETIC LAYER TO A WEB OR SHEET MATERIAL

[75] Inventors: Hartwig Andries, Mortsel, Belgium; Werner Krafft, Leverkusen, Germany; Willem Muës, Tremelo; Jan Gilleir, Mortsel, both of Belgium

[73] Assignee: Agfa-Gevaert, N.V., Mortsel, Belgium

[21] Appl. No.: 348,962

[22] Filed: Nov. 28, 1994

[30] Foreign Application Priority Data

Dec. 24, 1993 [EP] European Pat. Off. ............. 93203673

[51] Int. Cl.$^6$ ..................................................... G03C 1/76
[52] U.S. Cl. .................. 430/501; 430/496; 430/140; 430/523; 427/131; 428/694 BS
[58] Field of Search ..................................... 430/496, 501, 430/140, 523; 427/131; 428/694 BS

[56] References Cited

U.S. PATENT DOCUMENTS

| | | | |
|---|---|---|---|
| 4,781,965 | 11/1988 | Hashimoto et al. | 428/694 BS |
| 4,994,306 | 2/1991 | Takahashi et al. | 427/131 |
| 5,030,484 | 7/1991 | Chino et al. | 427/131 |
| 5,147,768 | 9/1992 | Sakakibara | 430/140 |
| 5,186,754 | 2/1993 | Umemura et al. | 427/131 |
| 5,215,874 | 6/1993 | Sakakibara | 430/501 |
| 5,250,404 | 10/1993 | Sakakibara | 430/140 |
| 5,387,464 | 2/1995 | Kato et al. | 428/694 BS |
| 5,389,418 | 2/1995 | Ota et al. | 428/694 BS |

*Primary Examiner*—Mark F. Huff
*Attorney, Agent, or Firm*—Breiner & Breiner

[57] ABSTRACT

A method is provided for applying a magnetic layer onto a polymeric sheet or web material comprising the steps of (i) simultaneously coextruding a non magnetic "dummy" layer and a magnetic layer onto said polymeric sheet or web material, said non magnetic "dummy" layer being closest to the support (ii) drying the coextruded layers characterised in that the sum of the wet coating thickness of said "dummy" layer ($Th_{dum}$) and of the wet coating thickness of said magnetic layer ($Th_{mag}$) fulfils the equation $25\ \mu m \leq Th_{dum} + Th_{mag} \leq 100\ \mu m$ and that the ratio of ($Th_{mag}$) to ($Th_{dum}$) fulfils the equation $0.01 \leq Th_{mag}/Th_{dum} \leq 1$.

16 Claims, No Drawings

100 5,573,897

METHOD OF APPLYING A TRANSPARENT MAGNETIC LAYER TO A WEB OR SHEET MATERIAL

DESCRIPTION

1. Field of the Invention

This invention relates to a coating method for thin magnetic layers onto a polymeric support. More particularly, but not exclusively, this invention relates to a coating method for thin, transparent magnetic layers onto a polymeric support for use in photographic materials.

2. Background of the Invention

The use of transparent magnetic layers in photographic materials is well known and has been described in e.g. U.S. Pat. No. 3,782,947, U.S. Pat. No. 4,279,945, U.S. Pat. No. 4,990,276, EP-A 476 535, WO 91/011750. The possibility to record simultaneously an image on the light sensitive layer of a photographic material and other information on the magnetic layer incorporated in said photographic material presents advantages for the photographer and for the photofinisher. The photographer can record information concerning the circumstances of het photograph (e.g. date, weather, etc), information for the photofinisher (e.g. enlargement ratio, number of prints, etc) and information concerning the photographic technique (e.g. aperture, exposure time, use of flash etc). The photofinisher can record in the magnetic layer, that keeps its magnetic properties after the processing of the photographic material, information that regards the printing technique (e.g. color balance, color correction, etc.)

Systems for signal input in (transparent) magnetic layers incorporated in a photographic material are described in e.g. WO 90/004205, WO 90/004212.

In e.g. U.S. Pat. No. 4,963,433, WO 91/011750 and EP-A 552 611 it has been disclosed to use thin magnetic layers that are at most 2 μm thick, preferably at most 1 μm.

The application of such magnetic layers can proceed through the co-casting of a cellulose triacetate dope without magnetic particles and a cellulose triacetate dope comprising magnetic particles as disclosed e.g. in WO 91/011750, U.S. Pat. No. 5,250,404 and EP-A 535652.

Also by coextruding two polyester melts, one not containing magnetic particles and one containing magnetic particles to form a polyester support comprising a magnetic layer has been disclosed in e.g. U.S. Pat. No. 5,215,874.

Another way to apply said magnetic layer(s) is to coat said layer(s) from a solution on a support, so that the polymeric binder for the magnetic layer does not have to be the same type of polymer as the polymer comprised in the support.

In e.g. U.S. Pat. No. 4,863,793, U.S. Pat. No. 4,963,433 and EP-A 552 611 a support is first coated with a thick non-magnetic layer, to smoothen out the roughness of the surface of the support, and then, while said thick non-magnetic layer is still wet, a thin magnetic layer is coated on top of it. In these documents two coating methods are disclosed. The first is a method in which the undercoat is coated first by roller coating, smoothed over a smoothing roller and then the magnetic layer is coated by extrusion coating. The second consists of simultaneously coating both layers by means of a head having two coating slits. No preference however for one of the coating methods is disclosed. Also in RD 34390, November 1992 and EP-A 476 535 it is disclosed that said magnetic layer(s) with dry thickness under 1.5 μm, can be coated with any known coating method. RD 34390, November 1992 p. 872 last paragraph and EP-A 476 535 p. 9 enumerate different coating methods but remain silent over the best mode of operation.

In the manufacturing of photographic materials it is known to coat thin layers from a dispersion of solid particles in binder solution by e.g. extrusion coating, as disclosed in e.g. BE 828 862, U.S. Pat. No. 2,681,294, U.S. Pat. No. 2,761,418 and EP-A 545 084. Advantages of extrusion coating are that the coating film thickness is determined by the liquid flow rate, no excessive coating liquid has to be removed from the support and good eveness can be obtained. When using however said extrusion coating technique for coating a high viscosity magnetic liquid at a speed of several tens of m/min it is difficult to coat the thin film in a stable way: a minimum wet coating thickness of the coated layer is required.

This minimum wet coating thickness of the coated layer could be achieved by highly diluting the coating solution which results in a higher wet coating thickness for the same dry thickness. It is however not possible to dilute the coating solution for a magnetic layer far enough to achieve a high wet coating thickness together with a low dry coating thickness for ecological as well for technical reasons. A high dilution brings about the necessity to evaporate a high amount of solvents, which is from an ecological point of view unacceptable and a high dilution destabilizes easily a dispersion of magnetic particles in a binder solution.

It is thus difficult, when having to coat a magnetic layer, which in dry state has a thickness around 1 μm, to reconcile the need for a stable dispersion of magnetic particles with a relative high wet coating thickness of the magnetic layer needed for achieving the desired coating quality and desired coating speed.

3. Object and Summary of the Invention

It is an object of the invention to provide a method for coating a thin magnetic layer onto a support from a stable dispersion of magnetic particles in a binder solution, said method enabling an even coating of said magnetic layer and thus making it possible to achieve excellent magnetic properties, without needing to smoothen the magnetic layer in a special smoothing step.

It is a further object of the invention to provide a method for coating a thin magnetic layer onto a support from a stable dispersion of magnetic particles in a binder solution, said method enabling an even coating of said magnetic layer without the need of compromising, when designing said dispersion of said magnetic particles between the needs for excellent magnetic properties and the need for excellent coating quality.

Further objects and advantages of the present invention will become clear from the detailed description hereinafter.

The objects of the invention are accomplished by providing a method for applying a magnetic layer onto a polymeric sheet or web material comprising the steps of (i) simultaneously coextruding a non magnetic "dummy" layer and a magnetic layer onto said polymeric sheet or web material, said non magnetic "dummy" layer being closest to the support (ii) drying the coextruded layers characterised in that the sum of the wet coating thickness of said "dummy" layer ($Th_{dum}$) and of the wet coating thickness of said magnetic layer ($Th_{mag}$) fulfils the equation 25 μm$\leq Th_{dum}+Th_{mag}\leq$100 μm and that the ratio of ($Th_{mag}$) to ($Th_{dum}$) fulfils the equation $0.01\leq Th_{mag}/Th_{dum}\leq 1$.

Preferably said sum of ($Th_{mag}$) and ($Th_{dum}$) fulfils the equation 30 μm$\leq Th_{dum}+Th_{mag}\leq$60 μm and the ratio of ($Th_{mag}$) to ($Th_{dum}$) fulfils the equation $0.05 \leq Th_{mag}/Th_{dum} \leq 0.5$.

4. Detailed Description of the Invention

It is known that it can be advantageous to coat two thin layers of miscible liquids simultaneously, when one of the layers is too thin to be coated alone, see e.g. D. Cohen and L. E. Scriven in Abstracts of IS&T's 46$^{th}$ Annual conference p 312 (1993).

To implement this suggestion for coating a magnetic layer according to the present invention, it is necessary to introduce into the material a "dummy" layer that is only present to help the coating of said magnetic layer and that by its presence in the finished material does not influence the magnetic properties of said magnetic layer. A "dummy" layer has been disclosed in EP-A 554 855 in combination with a special coating apparatus.

The "dummy" Layer

It has been found that such a "dummy" layer can be designed and that a thin magnetic layer combining excellent coating qualities and with excellent magnetic properties can be extrusion coated between 20 and 200 m/min in known coextrusion apparatus as disclosed in e.g., BE 828 862, U.S. Pat. No. 2,681,294, U.S. Pat. No. 2,761,418, etc.

To do so, said thin magnetic layer must be coextruded onto a support together with said "dummy" layer and the sum of the wet coating thickness of said "dummy" layer ($Th_{dum}$) and of the wet coating thickness of said magnetic layer ($Th_{mag}$) and the ratio of the wet coating thickness ($Th_{dum}$) of said "dummy" layer and of the wet coating thickness ($Th_{mag}$) of said magnetic layer must be within certain boundaries.

To achieve good coating quality the sum of the wet coating thickness of said "dummy" layer ($Th_{dum}$) and of the wet coating thickness of said magnetic layer ($Th_{mag}$) must fulfil the equation $25 \ \mu m \leq Th_{dum}+Th_{mag} \leq 100 \ \mu m$ and to achieve the desired magnetic properties of a magnetic layer, according to the present invention, the ratio of ($Th_{mag}$) to ($Th_{dum}$) must fulfil the equation $0.01 \leq Th_{mag}/Th_{dum} \leq 1$.

More preferably said sum of the wet coating thickness of said "dummy" layer ($Th_{dum}$) and of the wet coating thickness of said magnetic layer ($Th_{mag}$) fulfils the equation $30 \ \mu m \leq Th_{dum}+Th_{mag} \leq 60 \ \mu m$ and the ratio of ($Th_{mag}$) to ($Th_{dum}$) fulfils the equation $0.05 \leq Th_{mag}/Th_{dum} \leq 0.5$.

The "dummy" layer, according to the present invention, comprises preferably at least one polymeric binder.

Preferred polymeric binders to be used in the "dummy" layer of the present invention, are selected according to TEST A.

TEST A

The polymeric binders intended to be used in a method according to the invention are dissolved in a 4/1 tetrahydrofuran/cyclohexanon (THF/ANON) mixture in concentrations of 3%, 6%, 9%, 12% and 15% w/w.

The viscoelasticity of said solutions of polymeric binders for the "dummy" layer according to the present invention is measured in a RHEOMETRICS RVE rheometer, available through Rheometrics Inc. 2438 U.S. HY. No 22, Union N.J. 07083. This rheometer is a double parallel-plate oscillation viscometer. The diameter of the parallel plates is 50 mm, the space between the two parallel plates, with the sample in place, was 1.60 mm.

During measurement, the atmosphere of the actual measurement chamber is saturated with vapours of the solvent. Measurement proceeds at room temperature, at a rotation velocity of 100 rad/sec, while the oscillation amplitude is 100%.

The apparatus makes it possible to read G" the plastic component of the shear modulus in Pa, G', the elastic component of the shear modulus in Pa, η*, the complex viscocity in Pa.sec. From G" and G' the viscoelastic behaviour can be characterized by:

$$tg(d)=G''/G'$$

Polymeric binders preferred for use in the "dummy" layer according to the present invention, when in the concentration range from 3 to 15% w/w at least one concentration is found whereby the solution has a tg(d) fulfilling the equation $1 \leq tg(d) \leq 10$. Most preferred, for use in the "dummy" layer according to the present invention are polymeric binders with which it is possible to make a solution in a 4/1 THF/ANON mixture in the concentration range from 3 to 15% w/w showing a tg(d) fulfilling the equation $1 \leq tg(d) \leq 5$.

Polymeric binders useful in the "dummy" layer according to the present invention, are e.g. cellulose esters, such as cellulose acetate propionate, cellulose acetate butyrate, etc. Also high molecular weight polymethylmethacrylate such as ELVACITE 2041, available from Du Pont, Wilmington, USA or PLEXIGUM 920, available from Röhm & Haas, Germany, can be used as polymeric binders for the "dummy" layer according to the present invention. Other useful polymeric binders for the "dummy" layer according to the present invention are found in the class of polyester polyurethanes, polyether polyurethanes, or mixtures of polyester polyurethanes and copolymers of vinylchloride/vinylacetate/vinylalcohol. Useful polyester polyurethanes are available from BF Goodrich Chemical (Belgium), Brussels, Belgium under tradename ESTANE or from Morton International, Woodstock Ill,, USA under the tradename MORTHANE.

Preferably polymers produced by a reaction of polyvinylalcohol and at least one aliphatic aldehyde having 2 to 6 carbon atoms are used as binder polymers for the "dummy" layer according to the present invention. In a preferred embodiment said aldehyde is acetaldehyde and said polymeric binder is a polyvinyl acetal resin, available from Sekisui Plastics of Japan under the tradename S-LEC KS5Z. In the most preferred embodiment said aliphatic aldehyde is butyraldehyde and said polymeric binder is a polyvinyl butyral resin with a butyral content between 60 and 80 mole %, an hydroxyl content between 15 and 40 mole % and an acetyl content of at most 5 mole %. Such polyvinyl butyral resins are available trough Sekisui Plastics of Japan under the tradename S-LEC B, through Hoechst, Frankfurt Germany under the tradename MOWITAL B or through Monsanto company USA under the tradename BUTVAR.

It is possible to use binary or ternary blends of compatible polymers, fulfilling the TEST A in the "dummy" layer according to the present invention.

Preferably the coating composition for a "dummy" layer according to the present invention comprises between 3 and 15% w/w of said polymeric binder(s). Most preferably the coating composition for said "dummy" layer comprises between 5 and 10% w/w of said polymeric binder(s).

The dry "dummy" layer according to the present invention preferably comprises 1 to 4 g/m$^2$ of a polymeric binder or blend of polymeric binders described above; most preferably a dry "dummy" layer according to the present invention comprises 1.5 to 3 g/m$^2$ of said polymeric binder or blend of said polymeric binders.

Any solvent in which said polymeric binder(s) are soluble can be used for preparing the coating solution for a "dummy" layer according to the present invention. Solvents for said polymeric binder(s) may be:

- alcohols, e.g. ethanol, methanol, isopropanol, etc.
- cellosolves, e.g. methyl cellosolve, ethylcellosove, etc.
- ketones, e.g. acetone, ethylmethylketone, cyclohexanone, etc
- amides, e.g. dimethylacetamide, N-methyl-2-pyrrolidone, etc.
- ethers, e.g. tetrahydrofuran (THF), dioxane, etc>

It is also possible to use binary or ternary mixtures of compatible solvents chosen from the ones listed above.

Preferably a mixture of Tetrahydrofuran and Cyclohexanone in 1/4 to 5/1 w/w ratio is used for preparing the coating solution for the dummy layer according to the present invention.

The "dummy" layer, according to the present invention is preferably hardened. Any compound capable of crosslinking said polymeric binder for said coating composition can be used as hardener for the "dummy" layer according to the present invention. It is however preferred to harden said "dummy" layer with aliphatic or aromatic di- or polyisocyanates, most preferred of which are

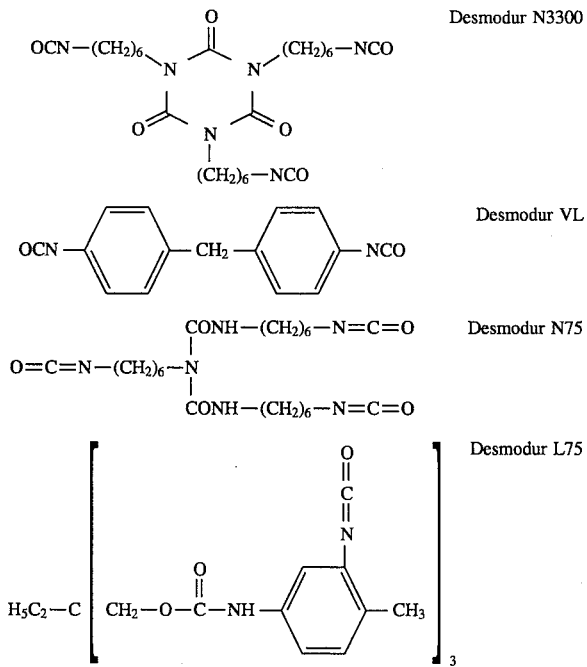

The above isocyanate compounds are all available from Bayer AG, Leverkusen, Germany.

The Magnetic Layer

The magnetic layer for use according to the present invention may comprise any ferromagnetic powder known to the skilled in the art. Examples of such ferromagnetic powders are e.g. ferromagnetic gamma-iron oxides, cobalt surface-treated ferromagnetic iron oxides, cobalt doped ferromagnetic iron oxides, cobalt containing $Fe_2O_3$, ferromagnetic magnetites, cobalt-containing ferromagnetic magnetites, ferromagnetic chromium dioxides, ferromagnetic metal powders, ferromagnetic iron powders, ferromagnetic alloys and ferromagnetic ferrites, etc.

Said ferromagnetic powders may be modified to provide lower. extinction coefficients, to index-match between powder and binder. Said modification may be the coating of a core of said ferromagnetic powder with a shell of low refractive index.

According to the present invention, cobalt doped ferromagnetic gamma-$Fe_2O_3$ is the preferred ferromagnetic powder to be included in the magnetic layer.

The ferromagnetic substances for use according to the present invention may have various sizes and shapes, and there are no particular restrictions to size or shape. However it is preferred to use ferromagnetic powders of which the particles have a BET-surface of at least 10 $m^2/g$ and at most 100 $m^2/g$. Although the magnetic layer according to the present invention may comprise ferromagnetic powders of any shape, it is preferred to use ferromagnetic powders with needle shaped particles with a length that is at most 0.4 μm and a length to width ratio between 4/1 to 8/1.

The amount of ferromagnetic powder in the magnetic layer according to the present invention ranges from 0.001 $g/m^2$ to 2 $g/m^2$. Preferably said amount of ferromagnetic powder ranges from 0.005 $g/m^2$ to 1 $g/m^2$, most preferably from 0.0$g/m^2$ to 0.1 $g/m^2$.

The magnetic layer according to the-present invention can comprise any binder known in the art e.g. thermoplastic resins, thermosetting resins, radiation-curable resins, reactive resins and mixtures thereof. Examples of suitable thermoplastic resins are:

- vinyl polymers suchs as copolymers of vinylchloride and vinylacetate, copolymers of vinylchloride, vinylacetate and vinylalcohol, maleic acid and/or acrylic acid, copolymers of vinylchloride/vinylidenechloride, vinyl chloride-acrylonitrile copolymers, etc.
- cellulose derivatives, such as nitrocellulose, cellulose acetate propionate, cellulose triacetate, etc.
- rubbery resins such as styrene-butadiene resins, butadieneacrylonitrile resins, etc.

Examples of other suitable resins for use according to the present invention are e.g. acrylic resins, polyester resins, polyvinylacetal or polyvinylbutyral resins, polyester polyurethane resins, polyether polyurethane resins, polyamide resins and amino resins.

Examples of radiation-curable resins, useful according to the present invention, include the above mentionned thermoplastic resins, that contain groups with a carbon to carbon unsaturated bond as a radiation-curable functional group. It is preferred to use acryloyl or methacryloyl groups as radiation-curable groups in said thermoplastic resins.

Binders for use in the magnetic layer according to the present invention may contain polar groups, e.g. hydroxy groups, epoxy groups, carboxy groups, sulfonate or sulfate groups, etc.

The magnetic layer according to the present invention can be hardened with conventional isocyanate hardeners or can be radiation-cured.

For the magnetic layer according to the present invention, it is preferred to use a polyester polyurethane resin as a binder and a isocyanate hardener as mentionned above. The most preferred polyester polyurethane resin is a polyurethane resin with acid number 0.6 and 0.8 mg KOH/g, Tg between 30 and 50, available from Morton International, Woodstock Ill., USA under the tradename MORTHANE CA-239.

The magnetic layer according to the present invention may comprise any dispersing agent or surfactant. Preferred dispersing agents or surfactants, according to the present invention are fluor containing molecules, lecithines or organic phosphate esters e.g. GAFAC RE 610, available from GAF Corp. USA,.

For use as dispersing agent or surfactant according to the present invention it is most preferred to use a fluorinecontaining dispersing agent. The most preferred fluorinated dispersing agent or surfactant for use according to the present invention is a fluorinated alkylester, available from 3M, St. Paul, Minn., USA under tradename FLUORAD FC 430.

The magnetic layer according to the present invention may comprise lubricating agents such as fatty acids, e.g. myristic acid, stearic acid, oleic acid, metallic soaps fatty acid esters, e.g. butylmyristate, isocetylstearate, ethyl hexyl palmitate, etc.

fatty acid esters of polyhydric alcohols or esters of polybasic acids.

Other lubricants such as paraffines, higher aliphatic alcohols, alkylphosphates, silicone oil, mineral, animal or vegetable oils, higher aliphatic amines or fine inorganic substances (e.g. silica, graphite etc.) can be used in the magnetic layer according to the present invention.

It is preferred to use fatty acids as lubricating agent in the magnetic layer according to the present invention, especially fatty acids containing 10 to 20 carbon atoms are preferred lubricating agents.

It is preferred, according to the present invention, to coat a protective layer on top of the magnetic layer. This protective layer is preferably coated from a coating solution comprising the same polymeric binder as the coating solution of the magnetic layer. Said protective layer is preferably hardened with an isocyanate hardener equal or similar to the one used for hardening the "dummy" layer. Said protective layer may comprise lubricants, as e.g. metal salts of fatty acids, wax dispersions or polysiloxanes, matting agents, e.g. polymethylmethacrylate beads, homodisperse silica beads, coating agents, antistatic agents (e.g. polyethyleendioxythiophene as disclosed e.g. in EP-A 440 957), etc.

The Support

It is possible to use a wide variety of polymeric, either opaque or transparent supports for coating the "dummy" layer and the magnetic layer according to the present invention. They include, for example, transparent supports as those used in the manufacture of photographic films including cellulose acetate, cellulose acetate propionate or cellulose acetate butyrate, polyesters such as poly(ethyleneterephthalate), polyethylenenaphtalates, polyamides, polycarbonates, polyimides, polyolefins, poly(vinylacetals), polyethers and polysulfonamides. Other examples of useful high-quality polymeric supports for the present invention include opaque white polyesters as disclosed in e.g. U.S. Pat. No. 4,780,402, EP-A 182 253 etc and extrusion blends of-poly(ethylenenterephthalate) and polypropyleen as disclosed in e.g. U.S. Pat. No. 4,187,113 or a multi-ply support of coextruded layers of a polyester/polyolefine blend and polyester comprising white pigments as disclosed in e.g. European application 92202460.9 filed on Aug. 8, 1992.

It is preferred to use either cellulose triacetate, polyethyleneterephthalate or modified polyesters as a support for coating the "dummy" layer and the magnetic layer according to the present invention. Examples of modified polyesters are:

polyethyleneoxide containg polyesters as disclosed in e.g. U.S. Pat. No. 4,271,441, WO 92/013021, EP-A 493 008 polyesters comprising sulfonic acid groups or salts thereof as disclosed in e.g. U.S Pat. No. 3,052,543, WO 92/013021, European application 93 201476.4 filed on May 24, 1993.

polyesters comprising sulfonic acid groups, combined with aliphatic acids, as disclosed in e.g. EP-A 496 346, EP-A 334 367.

When using a modified polyester support as support for the "dummy" layer and the magnetic layer according to the present invention it is preferred to use a copolyester support, said copolyester comprising polyether group(s) in the side chain. Such a support is preferably a copolyester prepared by a condensation reaction of at least one dicarboxylic acid in acid or ester form and at least one diol and wherein either at least one diol, dicarboxylic acid in acid or ester form or monohydroxycarboxylic acid in acid or ester form containing a polyether group in the side chain are added to the reaction mixture.

Most preferably a copolyester support, wherein the compounds that are copolycondensed to introduce (a) polyether group(s) in the side chain of the copolyester correspond to formula (I):

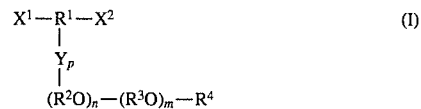

Wherein:

$R^1$ represents an alkylene, arylene, aralkylene or cycloalkylene group $X^1$ and $X^2$ each independently represent OH or COOR, with R=H or a lower alkyl group Y represents a linking group selected from the group consisting of O, NH, COO or $SO_2$ $R^2$ and $R^3$ each independently represent an alkylene group with 1 to 4 C-atoms $R^4$ represents a lower alkyl group or aryl which may be substituted with an hydrophilic group selected from the group consisting of sulphonic, sulphinic, phosphonic and carboxylic acids in salt form.

n is an integer between 0 and 200 m is an integer between 0 and 100 n+m>1 p equals 0 or 1

Most prefarbly a polyester support comprising polyether group(s) in the side chain, as described above together with sulfoisophtalic acid units is used as support for the "dummy" layer and the magnetic layer according to the present invention either as a single-ply film or as a multi-ply support of coextruded layers of a polyester blend (of normal and modified polyester) and one or two layers of modified polyester.

The support for the "dummy" layer and the magnetic layer according to the present invention may comprise a primer or subbing layer to improve the bonding between said "dummy" layer and magnetic layer and the support. As subbing layer for said "dummy" layer and said magnetic layer, subbing layers as described e.g. in EP 0 078 559, U.S. Pat. No. 3,751,280, European application 92200593.9 etc are preferred. Said subbing layers may also comprise antistatic products as described e.g. in European application 92 203978.9, filed Dec. 17, 1992, U.S. Pat. No. 5,006,451, EP-A 429179. It is preferred, according to the present invention, to use a support coated on one or both sides with a transparent antistatic primer layer, wherein said layer contains (1) a polythiophene with conjugated polymer backbone in the presence of a polymeric polyanion compound and (2) a latex polymer having hydrophilic functionality, as disclosed in European application 92 203978.9, filed Dec. 17, 1992.

The Coating

The coextrusion coating of the "dummy" layer and the magnetic layer according to the present invention can proceed by any known extrusion coating system, known in the art of coating magnetic layers or photographic materials containing silver halide. Advantageously an extrusion method as described in Fr 1,370,920 may be used. A coating die as described in BE 829 569 or in U.S. Pat. No. 2,761,418 may be used. It is preferred to apply, during coating, a small pressure difference between the up- and downstream menisci.

For combining good coating quality of both said "dummy" layer and said magnetic layer and excellent magnetic properties of said magnetic layer, is preferred that the ratio of the wet coating coating thickness of said magnetic layer ($Th_{mag}$) to the wet coating thickness of said "dummy" layer ($Th_{dum}$) fulfils the equation $0.01 \leq Th_{mag}/Th_{dum} \leq 1$ and that the sum of the wet coating coating thickness of said magnetic layer ($Th_{mag}$) and the wet coating thickness of said "dummy" layer ($Th_{dum}$) fulfils the equation $25\ \mu m \leq Th_{dum} + Th_{mag} \leq 100\ \mu m$. Preferably the sum of the wet coating coating thickness of said magnetic layer ($Th_{mag}$) and the wet coating thickness of said "dummy" layer ($Th_{dum}$) fulfils the equation $30\mu m \leq Th_{dum} + Th_{mag} \leq 60\ \mu m$ and the ratio of the wet coating coating thickness of said magnetic layer ($Th_{mag}$) to the wet coating thickness of said "dummy" layer ($Th_{dum}$) fulfils the $0.05 \leq Th_{mag}/Th_{dum} \leq 0.5$.

Polymeric sheet or web materials, provided on one side with a magnetic layer by the method according to the present invention, can advantageously be used as a support for photosensitive materials, said photsensitive materials being coated on the side of said polymeric sheet or web materials opposite to said magnetic layer.

Said photosensitive material is preferably a photographic silver halide emulsion material and may contain (a) silver halide emulsion layer(s) of any type known to those skilled in the art. For example, these materials may contain a silver halide emulsion layer of the type used in continuous tone or halftone photography, microphotography, radiography and cineradiography. The defined polymeric sheet or web material may be used advantageously in black-and-white or colour photographic materials and likewise in silver halide emulsion layers intended for use in the silver complex diffusion transfer reversal (DTR) process as well as in a dye diffusion transfer process operating with silver halide emulsion layers.

For the composition of silver halide emulsion layers reference is made e.g. to Research Disclosure 17,643 of December 1978 and Research Disclosure 307,105 of November 1989.

Apart from light-sensitive hydrophilic gelatin-silver halide emulsion layers any other gelatin-containing layer that has not to be photosensitive may be applied.-For example, said gelatin-containing layer can be a gelatinous image-receiving layer containing physical development nuclei for use in diffusion transfer reversal photography (DTR-photography) or is a gelatinous image-receiving layer containing a mordant for image-wise transferred dyes. The principles and embodiments of silver image formation by DTR-photography are described e.g. by André Rott and Edith Weyde in the book "Photographic Silver Halide Diffusion Processes" - The Focal Press London and New York (1972), and the principles and embodiments of the production of colour images by dye diffusion transfer are described e.g. by C. Van de Sande in Angew. Chem. Int. Ed. Engl. 22, (1983) p. 191–209.

The polymeric sheet or web materials, treated according to the present invention, are preferably used for the manufacture of silverhalide containing photosensitive materials that are presented as roll-film.

The invention is illustrated by the following examples, but not limited thereto.

TEST METHODS

The coating quality was evaluated visually and given a score of 0 (excellent)

1 (very good)

2 (good)

3 (acceptable)

4 (bad)

5 (unacceptable)

The magnetic properties where evaluated as the obtainable magnetic signal to noise ratio: a magnetic signal was recorded on the samples with recording density op 100 bpi, with a recording speed of 20 cm/sec and a current of 40 mA, with a magnetic head DR 130 (write=3 mm, read is 1 mm). The signal was read by manual movement of the head assembly to determine the signal, defined as 2 times the amplitude of said signal and the noise. The signal to noise ratio is expressed in dB.

EXAMPLE 1

Several polymeric binders were dissolved in a mixture of tetrahydrofuran/cyclohexanone 4/1, each of these solutions was used to coat a "dummy" layer together with a magnetic layer. The hardening of the "dummy" layer was the same as described in example 2, and also the magnetic layer had the same composition as described in example 2. No protective layer was present on the magnetic layer.

The coating solution for the "dummy" layer and the coating solution for the magnetic layer were coextruded through an extrusion die on a polyethyleneterephthalate support with an vinyldidene chloride based subbing layer. On top of the magnetic layer the coating solution for the protective layer was applied.

Before coating tg (d) and η* of the coating solutions for the "dummy" layer were determined according to TEST A.

After coating the coating quality was evaluated visually.

The result are to be found in table 1.

TABLE 1

| Polymeric binder | c[1] | η* | tg (d) | S[2] μm | R[3] | C Q[4] |
|---|---|---|---|---|---|---|
| BUTVAR B72 | 6% | 4.65 | 1.85 | 40 | 0.143 | 2 |
| ELVACITE 2041 | 10% | 16.95 | 0.64 | 35 | 0.167 | 3 |
| ELVACITE 2041 | 12% | 31.75 | 0.54 | 25 | 0.250 | 4 |
| MORTHANE CA239 | 12% | 3.2 | 7.33 | 90 | 0.059 | 2 |
| MORTHANE CA239 | 15% | 7.8 | 11.20 | 95 | 0.055 | 3 |
| MOWITAL B70H | 7% | 5.3 | 2.72 | 40 | 0.143 | 1 |
| S-LEC BX5 | 6% | 9.21 | 2.96 | 50 | 0.111 | 1 |
| S-LEC KS5Z | 5% | 4.13 | 3.69 | 40 | 0.143 | 1 |
| S-LEC BX5 | 7% | 19.24 | 2.07 | 40 | 0.143 | 1 |
| VINYLITE VAGH | 25% | 10.80 | 7.19 | 45 | 0.125 | 4 |

[1]: concentration of the polymer
[2]: $Th_{dum} + Th_{mag}$
[3]: $Th_{mag}/Th_{dum}$
[4]: Coating Quality visual according to scale described earlier.
η*: complex viscosity in Pas BUTVAR B72 is a trade name of Monsanto Company USA for a polyvinylbutyral (Mw 170,000 to 250,000, Tg : 72°–78° C. ELVACITE 2041 is a tradename of Du Pont, Wilmington USA for a high molecular weight polymethylmethacrylate. MORTHANE CA239 is a tradename of Morton International, Woodstock, Ill., USA for a polyesterpolyurethane. MOWITAL B70H is a tradename of Hoechst AG, Frankfurt, Germany for a polyvinylbutyral S-LEC BX5 and S-LEC KS5Z are tradenames of Sekisui Plastics, Japan for respectively a polyvinylburyral resin (Mw 130,000, Tg: 89° C.) and a polyvinylacetal resin (Mw 130.000, tg: 113° C.) VINYLITE VAGH is a tradename of Union Carbide, for a copoly(vinylchloride, vinylalcohol, vinylacetate) resin.

From the results it is clear that only when tg(d) is between 1 and 10 good coating quality is possible, and that, when it is desired to combine good coating quality with an acceptable wet thickness for the sum of the "dummy" layer and the wet thickness of the magnetic layer, tg(d) is best between 1 and 5. Although VINYLITE VAGH in 25 % concentration, fulfils the condition of tg(d) between 1 and 10, the coating quality is bad due to the high concentration of the polymer, needed to fulfil the condition on tg(d).

EXAMPLE 2

(i) Coating solution for the "dummy" layer 70 parts (weight) of a polyvinylbutyral resin (Mw=130,000, Tg=89° C.) available under tradename S-LEC BX5 from Sekisui Plastic, Japan, were dissolved in 950 ml of a 4/1 w/w mixture of tetrahyfdrofuran and cyclohexanone (THF/ANON). 10 mg of DESMORAPID Z (dibutyl-Sn-dilaurate available through Bayer AG, Leverkusen Germany) are added and the volume of the solution was adjusted to 1000 ml by a 4/1 w/w mixture THF/ANON. This yieded a coating solution with viscosity 800 mPas at a shear rate$\leq 100$ sec$^{-1}$ and at 20° C. The coating solution for the "dummy" layer, measured according to TEST A, had tg(d)= 2.07.

(ii) Hardener solution for the "dummy" layer 500 parts (weight) of

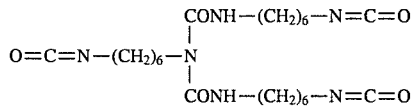

were dissolved in 500 ml tetrahydrofuran and the volume of the solution was adjusted to 1000 ml by tetrahydrofuran. 30 ml of this hardener solution was added pro liter of coating solution of the "dummy" layer.

(iii) Magnetic pigment dispersion (DP1)

20 g of co-doped ferromagnetic gamma iron oxide (available from ISK Magnetics, Bethlehem, Pa. USA under tradename VS-9927S) was mixed with 25.09 g of tetrahydrofuran, 50.18 g of cyclohexanone, 4 g of a polyester polyurethane resine available from Morton International, Woodstock Ill., USA under tradename MORTHANE CA 239, 0.21 g of lecithine, 0.52 g of a vinylpolymer with Mw$_{average}$ around 35,000, and hydroxyl content of 1.8 % w/w and Tg of 73, available from Union Carbide, Danbury Conn., USA under tradename UCARMAG 527. This mixture was passed 8 times through a sandmill, containing ZrSiO$_3$-spheres, for a total milling time of 30 minutes.

(iv) Coating solution for the magnetic layer 4.76 g of magnetic pigment dispersion DP1 were mixed with 52.51 g of cyclohexanone, 26.26 g of tetrahydrofuran and 12.68 g of a polyester polyurethane resin available from Morton International, Woodstock Ill., USA under tradename MORTHANE CA 239, and 0.03 g of a fluorinated alkylester, available from 3M, St. Paul, Minn., USA under tradename FLUORAD FC 430, to give a coating solution with viscosity 511 mPas at shear rate$\leq 100$ sec$^{-1}$ and at 20° C.

(v) Coating solution for a protective layer 20 parts (weight) of a polyester polyurethane resin available from Morton International, Woodstock Ill., USA under tradename MORTHANE CA 239 were dissolved, together with 3.00 g of a hardener with formula

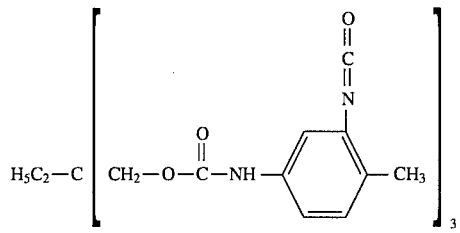

250 mg of polymethylmethacrylate beads with average particle diameter between 1.3 and 1.4, and 100 mg TEGOGLIDE 410 (a polysiloxane available from Tego Chemie Service GMBH, Germany in a methylethylketone/cyclohexanone mixture (7/1 w/w) to yield 1000 ml coating solution.

The coating solution for the "dummy" layer and the coating solution for the magnetic layer were coextruded through an extrusion die on a polyethyleneterephthaloate support with an vinylidene chloride based subbing layer. The coating solution for the protective layer was coated on top of the magnetic layer.

The sum of Th$_{dum}$ and Th$_{mag}$ was 40 µm and Th$_{mag}$/Th$_{dum}$ was 0.18

After drying the "dummy" layer was 2.8 µm thick and the magnetic layer 0.8 µm, the magnetic layer comprised 60 mg of Co-doped gamma iron oxide pro m$^2$.

The coating quality of the layers coated according to this example was evaluated 1 and the magnetic signal to noise ratio was 31 dB.

EXAMPLE 3

Example 2 was repeated, except for the composition of the coating solution of the "dummy" layer and the magnetic layer, which were as follows:

(i) Coating solution for the "dummy" layer 50 parts (weight) of a polyvinylacetal resin (Mw=130,000, Tg=113° C.) available under tradename S-LEC KS5Z from Sekisui Plastic, Japan, were dissolved in 960 ml of a 4/1 w/w mixture of tetrahydrofuran and cyclohexanone (THF/ANON). 6 mg of DESMORAPID Z (dibutyl-Sn-dilaurate available through Bayer AG, Leverkusen Germany) are added and the volume of the solution was adjusted to 1000 ml by a 4/1 w/w mixture THF/ANON. This yieded a coating solution with viscosity 250 mPas at a shear rate$\leq 100$ sec$^{-1}$ and at 20° C. The coating solution for the "dummy" layer, measured according to TEST A, had tg(d)= 3.69.

(ii) Hardener solution for the "dummy" layer

The same hardener solution as in example 2 was used, but only 10 ml of this hardener solution was added pro liter of coating solution of the "dummy" layer.

(iii) Magnetic pigment dispersion (DP2)

20 g of co-doped ferromagnetic gamma iron oxide (available from ISK Magnetics, Bethlehem, Pa. USA under tradename VS-9927S) was mixed with 23.7 g of tetrahydrofuran, 50.8 g of cyclohexanone, 4 g of a polyester polyurethane resine available from Morton International, Woodstock Ill., USA under tradename MORTHANE CA 239, 0.21 g of lecithine, 0.52 g of a vinylpolymer with Mw$_{average}$ around 35,000, and hydroxyl content of 1.8 % w/w and Tg of 73, available from Union Carbide, Danbury Conn., USA under tradename UCARMAG 527 and 0.68 g of a fluorinated alkylester, available from 3M, St. Paul, Minn., USA under tradename FLUORAD FC 430. This mixture was passed 8 times through a sandmill, containing ZrSiO$_3$-spheres, for a total milling time of 30 minutes.

(iv) Coating solution for the magnetic layer 5.71 g of magnetic pigment dispersion DP2 were mixed with 13.57 g of cyclohexanone, 64.53 g of tetrahydrofuran and 12.87 g of a polyester polyurethane resin available from Morton International, Woodstock Ill., USA under tradename MORTHANE CA 239, to give a coating solution with viscosity 511 mPas at shear rate≦100 sec$^{-1}$ and at 20° C.

The coating solution for the "dummy" layer and the coating solution for the magnetic layer were coextruded through an extrusion die on a polyethyleneterephthalate support with an vinylidene chloride based subbing layer. On top of the magnetic layer the coating solution for the protective layer was applied.

The sum of Th$_{dum}$ and Th$_{mag}$ was 40 μm and Th$_{mag}$/Th$_{dum}$ was 0.14

After drying the "dummy" layer was 1.9 μm thick and the magnetic layer 0.7 μm, the magnetic layer comprised 60 mg of Co-doped gamma iron oxide pro m$^2$.

The coating quality of the layer coated according to this example was evaluated 1 and the magnetic signal to noise ratio was 30 dB.

EXAMPLE 4

Example 2 was repeated except for the composition of the coating solution of the "dummy" layer and the magnetic layer, which were as follows:

(i) Coating solution for the "dummy" layer 60 parts (weight) of a polyvinylbutyral resin (Mw=170,000 to 250,000, Tg=72°–78 ° C.) available under tradename BUTVAR B72 from Monsanto, were dissolved in 950 ml of a 4/1 w/w mixture of tetrahyfdrofuran and cyclohexanone (THF/ANON). 7 mg of DESMORAPID Z (dibutyl-Sn-dilaurate available through Bayer AG, Leverkusen Germany) are added and the volume of the solution was adjusted to 1000 ml by a 4/1 w/w mixture THF/ANON. This yieded a coating solution with complex viscosity of 4.56 Pas. The coating solution for the "dummy" layer, measured according to TEST A, had tg(d)=1.85.

(ii) Hardernet solution for the "dummy" layer

The same hardener solution as in example 2 was used, but only 10 ml of this hardener solution was added pro liter of coating solution of the "dummy" layer.

(iii) Magnetic pigment dispersion (DP3)

20 g of co-doped ferromagnetic gamma iron oxide (available from ISK Magnetics, Bethlehem, Pa. USA under tradename VS-9927S) was mixed with 25.09 g of tetrahydrofuran, 50.18 g of cyclohexanone, 4 g of a polyester polyurethane resine available from Morton International, Woodstock Ill., USA under tradename MORTHANE CA 239, 0.52 g of a vinylpolymer with Mw$_{average}$ around 35,000, and a hydroxyl content of 1.8 % w/w and Tg of 73, available from Union Carbide, Danbury Conn., USA under tradename UCARMAG 527. This mixture was passed 8 times through a sandmill, containing ZrSiO$_3$-spheres, for a total milling time of 30 minutes.

(iv) Coating solution for the magnetic layer 4.76 g of magnetic pigment dispersion DP3 were mixed with 52.5 g of cyclohexanone, 26.26 g of tetrahydrofuran and 12.68 g of a polyester polyurethane resin available from Morton International, Woodstock Ill., USA under tradename MORTHANE CA 239 and 0.03 g of a fluorinated alkylester, available from 3M, St. Paul, Minn., USA under tradename FLUORAD FC 430, to give a coating solution with viscosity 511 mPas at shear rate≦100 sec$^{-1}$ and at 20° C.

The coating solution for the "dummy" layer and the coating solution for the magnetic layer were coextruded through an extrusion die on a polyethyleneterephthalate support with an vinylidene chloride based subbing layer. The coating solution for the protective layer was applied on top of the magnetic layer.

The sum of Th$_{dum}$ and Th$_{mag}$ was 40 μm and Th$_{mag}$/Th$_{dum}$ was 0.18

After drying the "dummy" layer was 2.2 μm thick and the magnetic layer 0.8 μm, the magnetic layer comprised 60 mg of Co-doped gamma iron oxide pro m$^2$.

The coating quality of the layer coated according to this example was evaluated 2 and the magnetic signal to noise ratio was 31 dB.

We claim:

1. A method for applying a transparent magnetic layer onto a support of a polymeric sheet or web material comprising the steps of (a) simultaneously coextruding a coating solution to form a non-magnetic "dummy" layer and a coating solution to form a magnetic layer onto said polymeric sheet or web material, both said dummy layer and said magnetic layer being at the same side of the support and said non-magnetic "dummy" layer being closest to the support and (b) drying said layers characterised in that
    (i) said dummy layer has a wet coating thickness (Th$_{dum}$) and said magnetic layer has a wet coating thickness (Th$_{mag}$) fulfilling the following equations I and II:

$$25 \text{ μm} \leq Th_{dum} + Th_{mag} \leq 100 \text{ μm} \quad \quad \text{I}$$

and $$0.01 \leq Th_{mag}/Th_{dum} \leq 1 \quad \quad \text{II}$$

(ii) said coating solution for said dummy layer comprises between 3 and 15% of a polymeric binder,
    (iii) said polymeric binder is a reaction product of polyvinylalcohol and at least one aliphatic aldehyde having 2 to 6 carbon atoms and
    (iv) said coating solution for said dummy layer has a tg(d) between 1 and 10.

2. A method according to claim 1, wherein said wet coating thickness of said "dummy" layer (Th$_{dum}$) and said wet coating thickness of said magnetic layer (Th$_{mag}$) fulfills the equations III and IV $$30 \text{ μm} \leq Th_{dum} + Th_{Mag} \leq 60 \text{ μm} \quad \quad \text{III}$$

$$0.05 \leq Th_{mag}/Th_{dum} \leq 0.5 \quad \quad \text{IV}$$

3. A method according to claim 1 wherein said coating solution for said dummy layer has a tg(d) between 1 and 5.

4. A method according to claim 1, wherein said aliphatic aldehyde is acetaldehyde or butyraldehyde.

5. A method according to claim 1, wherein said polymeric binder is a polyvinyl butyral resin with a butyral content between 60 and 80 mole %, an hydroxyl content between 15 and 35 mole % and an acetyl content of at most 5 mole %.

6. A method according to claim 1, wherein said "dummy" layer is hardened with an aromatic or aliphatic di- or polyisocyanate.

7. A method according to claim 1, wherein a protective layer is applied on top of said magnetic layer.

8. A method according to claim 7, wherein said protective layer comprises an isocyanate hardener.

9. A photographic material comprising a polymeric support of a polymeric sheet or web material, a dummy layer and a transparent magnetic layer coated on the same side of said support by a method comprising the steps of (a) simultaneously coextruding a coating solution to form a non-magnetic "dummy" layer and a coating solution to form a magnetic layer onto said polymeric sheet or web material, both said dummy layer and said magnetic layer being at the same side of the support and said non-magnetic "dummy" layer being closest to the support and (b) drying said layers characterised in that (i) said dummy layer has a wet coating thickness ($Th_{dum}$) and said magnetic layer has a wet coating thickness ($Th_{mag}$) fulfilling following equations I and II:

$$25 \ \mu m \leq Th_{dum} + Th_{mag} \leq 100 \ \mu m \qquad \text{I}$$

and $$0.01 \leq Th_{mag}/Th_{dum} \leq 1 \qquad \text{II}$$

(ii) said coating solution for said dummy layer comprises between 3 and 15% of a polymeric binder, (iii) said polymeric binder is a reaction product of polyvinylalcohol and at least one aliphatic aldehyde having 2 to 6 carbon atoms and (iv) said coating solution for said dummy layer has a tg(d) between 1 and 10.

10. A photographic material according to claim 9 wherein said dummy layer comprises between 1 and 4 g/m$^2$ of said polymeric binder.

11. A photographic material according to claim 9 wherein said dummy layer comprises between 1.5 and 3 g/m$^2$ of said polymeric binder.

12. A photographic material according to claim 9, wherein said aldehyde is acetaldehyde or butyraldehyde.

13. A photographic material according to claim 9, wherein said polymeric binder is a polyvinyl butyral resin with a butyral content between 60 and 80 mole %, an hydroxyl content between 15 and 35 mole % and an acetyl content of at most 5 mole %.

14. A photographic material according to claim 9, wherein said photographic material comprises at least one silver halide emulsion layer.

15. A photographic material according to claim 14, wherein said photographic material is presented as roll film.

16. A photographic material according to claim 9, wherein said support comprises a copolyester prepared by a condensation reaction of at least one dicarboxylic acid in acid or ester form and at least one diol and wherein either at least one diol, dicarboxylic acid in acid or ester form or monohydroxycarboxylic acid in acid or ester form comprise a polyether group as a side chain.

\* \* \* \* \*